Patented May 31, 1949

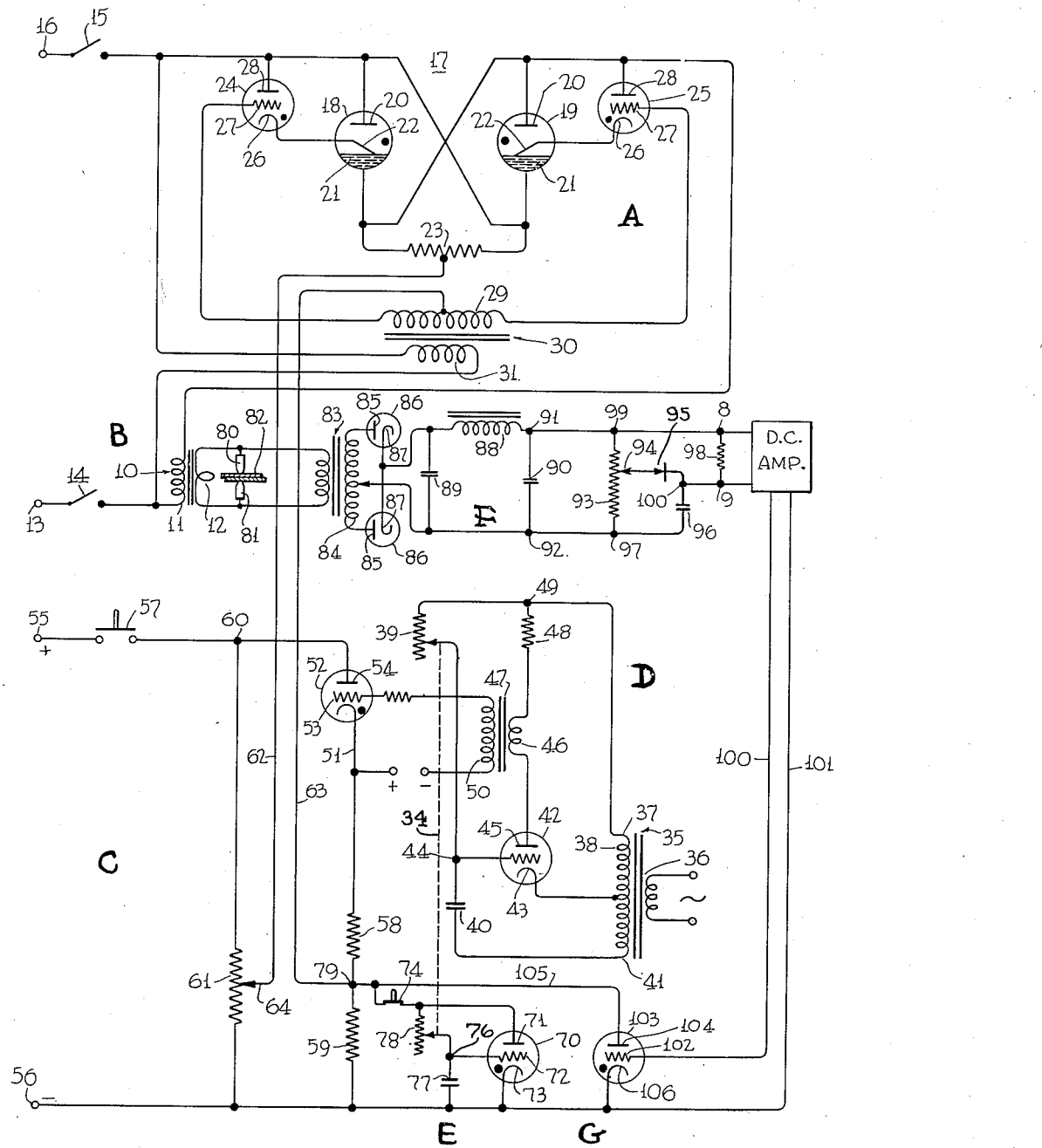

2,472,041

UNITED STATES PATENT OFFICE 2,472,041

WELD CONTROL SYSTEM

Henry Richard Davies, Philadelphia, Pa., assignor to The Budd Company, Philadelphia, Pa., a corporation of Pennsylvania Application March 31, 1944, Serial No. 528,864

14 Claims. (Cl. 219—4)

This invention relates to control means for operating circuits and has particular utility in connection with resistance welding.

In welding systems applicable to resistance welding, particularly spot welding, circuits are being successfully employed in which the control of the welding time period is electronic in nature. In connection with these electronic controls use is made of electronic contactors for establishing the welding circuit including mercury gas tubes or ignitrons, inversely connected together which supply current from alternate half-cycles of the alternating current source. Grid control gas tubes or thyratrons are usually associated with the ignitrons to determine the point of firing of the ignitron ignitors. In connection with the thyratrons there is utilized, in addition, timing means whereby a flow of current through the workpiece for a predetermined time interval is permitted at the weld electrodes through the workpiece thus assuring a definite and uniform amount of heat energy at the weld for successive weld points.

A disadvantage of the electronic system, as briefly described hereinabove, lies in the fact that the selected time interval in which the heat energy is applied for successive welds may be either insufficient in amount or excessive of the precise amount needed for a normal weld. The term "normal weld" as employed in this application is defined as one in which a minimum amount of fused metal is used that on solidification gives maximum attainable strength without development of undesired effects in the region of the weld. It is accompanied by fusion at the interface between welded parts. The term "complete weld" may also be defined as follows: a weld in which the amount of metal fused is minimum for the strength of weld desired, which may not necessarily be the maximum strength.

It is accordingly a primary object of the invention to provide a system of control applicable to welding circuits which will permit automatic termination of flow of the heat energy into the weld when a normal weld is completed. A further object of the invention is to provide a weld circuit opening arrangement which depends for control upon conditions existing in the workpiece at the weld between the electrodes.

An object, also, is to provide a type of welding control which may be applied to an ordinary electronic type welding circuit without extensive modification of the apparatus and equipment and circuits usually employed therewith.

Still another object is to provide a type of circuit and control which may be operated entirely independently of the usual timing control so that the functioning of the apparatus is dependent upon the completion of the weld only.

Objects of the invention, also are to provide a system in which joint use may be made of the usual automatic timer with a fixed time interval of weld interruption in conjunction with automatic means controlled by the conditions in the weld itself, and to provide, through the usual timing mechanism, a limiting device for automatic welding control dependent upon the weld itself so as to eliminate the possibility of overheating in case the automatic control fails to function properly.

Other objects inherent in the circuits and arrangement will appear on consideration of the following description of a preferred form of the invention and of the accompanying drawing.

Referring to the figure various branch circuit sections are indicated as A, B, C, D, E, F and G, section A including the main contactor circuit of a welding system, section B the welding transformer and electrodes, section C the contactor control circuit, section D the heat energy control circuits, section E the timer control circuit, section F the translating circuit, and section G the automatic weld control circuit.

In sections A and B the welding transformer 10 is formed with the usual primary 11 and secondary 12, one end of the primary having connection to a terminal 13 through main switch 14 and the other end of the transformer primary having connection through a group of inversely connected rectifiers and main switch 15 to a second terminal 16. The terminals 13 and 16 have direct connection to the source of alternating current requisite for the application of heating current to the welding circuit.

The contactor unit 17 positioned between the main switch 15 and primary 11 of the welding transformer 10 includes two mercury gas tubes or ignitrons 18 and 19, each having anodes 20, mercury cathodes 21 and ignitors 22. As shown, the anode 20 of tube 19 is connected to the cathode 21 of tube 18 and also to the welding transformer primary 11, and the anode 20 of tube 18 is connected to the cathode 21 of tube 19 and also to the source terminal 16. A resistor 23 is connected between the cathodes 21 of the ignitrons.

The ignitors 22 of the ignitrons are activated or fired by the grid control gas tubes or thyratrons 24 and 25, the tube 24 having a cathode 26 directly connected to ignitor 22 of the tube 18 and the thyratron 25 having similarly a cathode 26 connected directly to the ignitor 22 of a tube 19. Each of the thyratrons also has a grid 27 and an anode plate 28, the anodes having direct connection to the anode circuit of the associated ignitrons and the grids having connection together through the secondary 29 of the grid transformer 30. The primary 31 of this transformer has connection to the source terminals 13 and 16. It thus appears that alternating current supplied to the transformer 30 is made effective at the grids 27 of the thyratrons. The design of the transformer 30 is such as to produce a phase change between the grid 27 and anode 28 of the thyratrons of approximately 180° so that the potential between the grid and the anode of the thyratrons is maintained substantially below the striking point when main switches 14 and 15 are closed and the initiating switch 57 (later described) is open.

In order to determine the time interval of the current flow in the weld circuit, utilization is made of the contactor control circuit generally indicated by the letter C which is associated with a phase shift circuit D. The phase shift circuit D, by means of which the amount of heat energy applicable to the weld is determined, includes a transformer 35 having a primary 36 connected to a source of alternating current in phase with the main source current to the welding transformer, and a secondary 37, one end 38 of which is connected through a variable resistor 39 and a capacitor 40 to the other end 41 of the secondary. A vacuum tube 42 is employed in this circuit, the cathode 43 of which is connected to the midpoint of the secondary 37 of transformer 35, the grid being connected to a point 44 between the variable resistor 39 and capacitor 40, and anode 45 having connection through the primary 46 of a transformer 47 and through a resistor 48 to a point 49 between the variable resistor 39 and the point 38 of the transformer secondary 37. It is apparent that this branch circuit operates to develop a rectified current, the phase of which, with reference to the phase of the primary source 36 as transmitted through the primary 46, is variable in accordance with the position of the variable resistor 39. The secondary 50 of the transformer 47 at one end connects through a negative bias potential source to the cathode 51 of a gas tube 52 while the other end of the transformer secondary is connected through a resistor to the grid 53. The circuit established from the anode 54 and cathode 51 of tube 52 is part of a direct current branch circuit including source terminals 55 and 56, initiating switch 57 and potential dividing resistors 58 and 59 forming part of contactor control circuit C. For the purposes of the invention the tube 52 may be of either the gaseous or the vacuum type provided the associated constants are properly chosen, a gaseous tube being indicated. The point 60 between switch 57 and tube 52 is connected to terminal 56 by a shunt resistor 61.

Control of the ignitor thyratrons 24 and 25 is made effective by conductors 62 and 63, the conductor 62 leading from the midpoint of ignitron resistor 23 to a variable contact 64 on the shunt resistor 61 of the control circuit C and conductor 63 having connection from the midpoint of primary 29 of the grid transformer 30 to a point 79 intermediate the voltage dividers 58 and 59. It is apparent that variation of the position of the movable contact 64 on resistor 61 or the use of different values for resistor 61 will shift the direct current level effective on the grids of thyratrons 24 and 25 and thus provide a means of control of the striking points. It is also apparent that through variation of the contact point of variable resistor 39 in the phase shift circuit D the precise point in the half-cycle at which the tube 52 becomes effective to transmit an adequate potential for normally securing activation of the ignitors, may be selected.

The timing device which is ordinarily usable in the circuit as described and indicated by the letter E comprises a vacuum tube 70 having an anode 71, grid 72, and cathode 73. The cathode of this tube is connected directly to the negative terminal 56 of the C control circuit; the anode is connected through a manual switch 74 to a point 79 intermediate the resistors 58 and 59. The grid 72 has connection to a point 76 in a circuit in parallel with the tube 70 including a capacitor 77 and a variable resistor 78, the point of connection of the grid being between the resistor and capacitor.

The operation of the welding circuit, as hereinabove described, follows: When the main switches 14 and 15 are closed, alternating current, for example, of 60 cycle frequency is imposed on the main welding transformer but is ineffective to transmit current because of the inaction of the contactor ignitrons 18 and 19. While the thyratrons 24, 25 and transformer 30 are directly connected to the main transformer circuit, the phase difference between the voltage impressed on the anodes of the thyratrons by the line voltage and the grids of the thyratron by the transformer 30 is 180°, making the thyratrons ineffective to bring about passage of current flow through these tubes. Assuming that an alternating current in phase with the source potential is being applied to transformer 35 in the D phase shift circuit there is being impressed upon the grid 53 of tube 52, in the contactor control circuit C, a series of intermittent rectified impulses which are ineffective prior to the closure of the initiating switch 57. On the closure of this switch, however, a positive potential is applied at the anode 54 of the tube 52 and at the time interval determined by the D phase shift circuit, current flows through the tube 52 and the resistors 58 and 59 thereby impressing on the grids 27 of the ignitor thyratrons a positive direct current potential of sufficient amount to permit the alternating voltage of the thyratron grid transformer 30 to activate the thyratrons and establish a flow of current in the ignitron welding circuit. At the same time, with the switch 74 closed in the timing circuit E, capacitor 77 is being charged and the welding current will continue to flow until the positive charge on the capacitor 77 lifts the bias on grid 72 of tube 70 to the point where the tube strikes and a substantial current flows therethrough. In this way the potential of point 79 in the C circuit 63 is lowered to a point such as to de-energize the ignitron thyratrons 24 and 25.

The circuit as described to this point is conventional and no novelty is claimed therefor. There is associated, however, in combination with this circuit, a branch circuit F forming an automatic weld control circuit and having important advantages which will now be described. This circuit is associated with the secondary 12 of the welding transformer 10 and is susceptible to variation in the electrical conditions of this circuit so that when the weld through the workpiece has been completed to secure a so called normal weld the welding circuit will automatically become opened.

Referring to section F, the electrodes 80 and 81, connecting the terminals of the secondary 12, contact the workpiece 82 for the passage of current therethrough in the welding operation. It has been ascertained as disclosed in the copending application of Herbert D. Van Sciver, filed February 28, 1944, Serial Number 524,243, now Patent #2,433,967, that when a welding current has passed through the workpiece in the formation of a weld on completion of a normal weld, as hereinabove defined, the voltage at the electrode terminals drops appreciably, percentages of approximately 20% being usual. This drop may be in some cases substantially instantaneous—that is within a time period of one cycle of a sixty-cycle source current—and in other cases may involve a time interval of two or more cycles. Since this drop is appreciable, it is subject to definite measurement and the translating means F illustrates one mode of converting this voltage pulse into a definite force for opening the source current circuit automatically.

As illustrated, the voltage at the electrode terminals is passed through a rectifying transformer 83 having a secondary 84, the terminals of which are connected to the anodes 85 of rectifying diode tubes 86. The conductor connecting the cathodes 87 of the rectifying tubes is passed through a choke coil 88 and capacitors 89 and 90 comprising a filter circuit to the midpoint of the secondary 84 of transformer 83, thus providing substantially direct current at points 91 and 92 with the point 91 positive. Connected across this positive potential is a resistor 93 having a slide contact 94 which is connected in parallel with the resistor 93 through a metallic oxide rectifier 95 or the equivalent and a capacitor 96 to the negative terminal 97 of the resistor 93. The rectifier transmits current only toward the capacitor. A potential drop resistor 98 is connected between the positive end 99 of resistor 93 and a point 100 between the rectifier 95 and capacitor 96 as indicated in the figure. Opposite ends 8 and 9 of the resistor 98 are connected to a direct current amplifier of any conventional type as is well-known in this art, whence lead conductors 100 and 101 to the contactor control branch circuit C where the conductor 101 is connected directly to the negative terminal 56 of the C source. The conductor 100 is connected to the grid 102 of gas tube 103. The anode 104 of this tube has connection to voltage divider point 79 and the cathode 106 to the conductor 101 and terminal 56. The tube 103 therefore is included in a shunt circuit around timer tube 70 of circuit E.

The operation of the automatic control associated with the secondary of the welding transformer may now be explained. Assuming a welding current passing through a workpiece 82, the voltage at the electrode points of application is substantially constant although there may be a slightly rising tendency due to the general heating of the workpiece. This voltage is transformed, rectified and filtered and establishes a substantially constant, direct current voltage drop across resistor 93 between points 99 and 97. Current flowing through rectifier 95 also impresses the same voltage drop across the condenser 96, except as reduced by the variable resistance between points 94 and 99. The resistance of resistor 98 is sufficiently high to prevent an appreciable voltage change by condenser discharge within several current cycle intervals.

Accordingly, the voltage drop between points 8 and 9 across the resistor 98 may be zero or any fixed value as determined by adjustment of slider 94.

On completion of a normal weld accompanied by the disappearance of the interface resistance between parts being welded, there is a voltage drop at the electrode tips which is translated in the F circuit into a direct current voltage difference between points 8 and 9 on resistor 98. The voltage at point 8 drops with that of the electrode circuit while that of point 9 lags with the time constant of the capacitor-resistor circuit 96—98. This time lag is sufficient to cover the interval of the transient voltage decrement at the electrodes so that the average drop across 8—9 may be amplified as by the direct current electronic amplifier, of which numerous types are available, and impressed as a positive potential on the grid 102 of control tube 103 in circuit G. The impressed potential is sufficient to cause the tube to strike, whereupon the ignitrons and thyratrons 24 and 25 are de-energized and the weld circuit is opened.

The circuit as above described may be used in different ways in resistance welding. For example, it may be used so as to combine the function of fixed timing and automatic timing. To this end the switch 74 is closed and the variable resistor 78 adjusted so that the average fixed time of weld current is slightly in excess of the time of a normal weld for a given workpiece. In this use there is close limitation on the weld time, the automatic control functioning primarily.

In another use, the fixed timing is set above the normal maximum range of the automatic weld interval so that the automatic control functions exclusively except for occasional welds of unusual duration.

In still another use, which has practical advantages, the fixed timing control is adjusted for extreme intervals occurring only at complete failure of the automatic control to function, or may be omitted entirely. Obviously the fixed timing means as shown, may be modified to suit the particular time of welding circuit employed. Also the translating means shown for establishing a comparison potential through time discharge delay may be modified or displaced by other expedients known to those skilled in the art.

It is pointed out that if desired, the heat energy resistor 39 and timer resistor 78 may be ganged, with appropriate ratios, so that lesser heat settings for example, are accompanied by lesser fixed heating time intervals, and vice versa. The ganged connection 34 is shown by a dotted line. Also it should be observed that the automatic control means as described is substantially independent of resistance variation developing in the secondary circuit including the electrodes between successive welding intervals or between successive welding points. As is well known in this art, due to surface conditions of the workpiece at the point of engagement with the electrode tips as well as due to variation in the electrode pressure and the actual substance of the workpiece material between points of electrode engagement there is a variation in resistance at the weld point which may vary as much as 25% of the total resistance of the circuit between the electrodes through the workpiece. By adjustment of the weld control operating potential to the minimum potential value normally to be expected in a series of weld operations, the control is made operative for all voltage values in excess of this minimum value.

Other modifications of the described combination may be made, the bounds of the invention being set out in the claims as hereto appended.

What is claimed is:

1. In an electrical system including a power source, a load unit adapted to receive a voltage variable load, and a translating device connected to said unit for indicating load voltage variation, said device comprising an operating circuit including a resistor and plural means connected to said circuit for short-circuiting said resistor, one of said means functioning on conclusion of a predetermined time period of power supply, and another of said means functioning on load voltage change.

2. In combination, a welding unit including welding electrodes, a contactor for establishing a circuit connection between the electrodes and an alternating current source, a control for opening and closing said contactor, and means operative on voltage change on completion of a normal weld for actuating the control to change the source connection, said means comprising a rectifier circuit connected to the weld circuit including the workpiece, a resistor connected across said rectifier circuit to receive direct current therefrom, a movable connector engageable with said resistor, a rectifier and capacitor connected in series between said movable connector and a point on said rectifier circuit, and electronic means connecting said contactor control and rectifier for making effective on said control the voltage drop across the resistor to cause the opening of the contactor and weld circuit.

3. In combination, a welding unit including welding electrodes adapted to engage a workpiece, a contactor for establishing a circuit connection between the unit and a current source, a control for opening and closing said contactor, and means operative on voltage change at the electrodes due to weld fusion for actuating the control to open said contactor, said means comprising a resistor, circuit means connecting said resistor to said electrodes to supply a direct current component of electrode current to the resistor, a rectifier and capacitor connected in series across said resistor, means in said rectifier-capacitor connection for varying the percentage value of the capacitor voltage relative to the electrode voltage, and current connections between the contactor control and rectifier.

4. In a load control system, a load, an electrical power source for said load, circuit connections between the source and load, current modifying means in said connections, a control unit for actuating said current modifying means, a variable voltage device connected across said load, a capacitor, a capacitor input circuit including a rectifier connected across said variable voltage device for charging said capacitor to a percentage value of the initial load voltage, and a capacitor output circuit connected to said control unit responsive conjointly to the pre-change charge on said capacitor and to the full post-change voltage for operating said control unit to modify the current on change of voltage to the capacitor input circuit by a predetermined drop.

5. In combination, a welding unit including welding electrodes adapted to engage a workpiece, a current source connected to said welding unit, switch means for modifying the quantity of current transmitted between said source and said welding unit, a control circuit unit for operating the switch means, said control circuit unit including a resistor arranged to maintain an effective voltage balance in said control unit to maintain welding current on said welding unit, means for short-circuiting said resistor to unbalance said control unit after a predetermined time period of current supply from the source to the welding unit, and halt the supply of current to said welding unit, and separate means operative upon a predetermined voltage change at the electrodes due to weld fusion in the workpiece for short-circuiting said resistor to unbalance said control unit upon a predetermined voltage change independently of the operation of the time-responsive short-circuiting means.

6. In a welding system, a welding unit including welding electrodes adapted to engage a workpiece, an alternating current source connected to said welding unit, switch means for modifying the current transmitted from said source to said welding unit, a control circuit unit for operating the switch means, a first trigger device connected to said control circuit unit and effective after a predetermined fixed time period for initiating action of said control unit, a second trigger device connected to said control circuit unit and effective on voltage change at the electrodes due to weld completion for initiating action of said control unit, and means connected to said control circuit unit, other than said trigger means, for changing the quantity of current transmitted from said source to said welding unit to cause a weld to be made and electrode voltage to drop before the end of the predetermined time for which said first trigger means is set to bring the time of action of said second trigger device within the time period of said first trigger device.

7. In an electrical system including a power source, a load unit adapted to receive a voltage variable load, and a translating device connected to said unit for controlling the supply of current to the load, said translating device comprising an operating circuit, plural trigger means connected to said circuit, one of said trigger means functioning on conclusion of a predetermined time period of power supply to disconnect the load from the power source and another of said trigger means functioning on predetermined load voltage change to disconnect the load from the power source independently of the time-control trigger means, and power change means for changing the supply of current to said operating circuit to cause voltage change in the operating circuit before the end of the predetermined time for which said first trigger means is set, whereby the voltage change trigger means is timed to operate within the time period of action of the time-controlled trigger means.

8. In an electrical system including a power source, a load unit adapted to receive a voltage variable load, a translating device connected to said unit responsive to load voltage variation, said device comprising a capacitor connected in circuit to effect discharge upon occurrence of predetermined load voltage drop, a contactor for control of supply of power from said power source, a control circuit connected to said contactor, and a short-circuiting element in said control circuit interconnected with said translating device and responsive conjointly to the pre-change charge on said capacitor and to the full post-change voltage for disabling said contactor and disconnecting said load unit from said power source upon discharge of said capacitor.

9. In an electrical system including a power source, a load unit connected to the power source and having a subsequent voltage which differs materially from its initial voltage at a distinct point of voltage change, translating voltage comparator device connected between said load unit and a signal impulse responsive device, said comparator device including a capacitor, selective means for connecting said capacitor in a circuit from said load unit to fix upon the capacitor a charge which bears a predetermined selective percentage relationship to the charge which would be produced by the full initial voltage of said power unit, and means jointly responsive to the pre-change percentage charge voltage of said capacitor and the subsequent voltage of the power unit after voltage change for providing a control impulse due to voltage change of the power unit.

10. In an electrical power system, in combination, an electrical power source, a load unit receiving electric current from said source and having a variable voltage across the load, a translating device for indicating the voltage across the load, means for fixing a first charge which depends in value on precedent load voltage before change, comparator means for comparing the fixed precedent charge with a subsequent charge which is dependent in value on a subsequent load voltage, means responsive to the comparator means for furnishing a signal when the subsequent charge bears a predetermined relation to the first charge, and means for establishing the relationship of the subsequent charge to the first charge at which said signal is given.

11. In electric resistance welding apparatus, in combination, a power source of welding current, electrodes connected to said source and adapted to engage and form a weld in a workpiece, energy-response means connected to said electrodes, means controlled by said energy-response means for controlling the supply of current from said source to said electrodes, means dependent on weld formation in the workpiece and normally independent of absolute value of supply of welding power to said workpiece for actuating said energy-response means, said actuating means including a device sensitive to change of energy flow through said electrodes and workpiece for controlling actuation of said energy-responses means, and means for establishing the proportionate amount of energy change at which said actuating means functions to control the supply of current to the electrodes.

12. In resistance welding apparatus, power means for forming a weld in a workpiece, the formation of a weld causing a relatively sudden change in the rate at which energy is able to pass through the workpiece at the weld zone, energy-response means connected across the workpiece at the weld zone, means controlled by said energy-response means for furnishing an impulse signal of said change independently of the absolute passage of energy through the weld zone but automatically responsive to the rate of flow of energy through the weld zone prior to fusion and capable of comparing the pre-change flow to post-change flow of energy, and means for predetermining the proportion of change necessary to provide said impulse signal.

13. Control apparatus adapted for use on a workpiece whose physical condition is changed by the application of energy thereto and which change in physical condition is manifested by a relatively sudden and substantial change in the rate of passage of energy therethrough, comprising in combination, means for causing a flow of energy through the workpiece, means for indicating the change in rate of flow of energy through the workpiece, means for preserving a record of the rate of flow prior to change, means for comparing said record of pre-change flow with post-change flow, means for preselecting the proportion of change necessary to furnish a control impulse, and means for furnishing a control impulse when the record of the preselected pre-change flow and the full post-change flow are about equal.

14. A resistance welding system, comprising in combination, a power current source, a welding unit adapted to receive current from said source in separate periods for separate welds, the resistance and voltage across a weld as a load being subject to relatively sudden and pronounced change upon fusion of a weld in any given period, circuit means connected across said load adapted to provide a signal of voltage change therein, means for fixing a first charge which depends in value on pre-change voltage, comparator means for comparing said pre-change charge with a second charge which depends in value on post-change voltge and for furnishing a signal when a predetermined relationship between said charges is reached, and means for selectively establishing the relative values of said charges necessary to furnish a signal.

HENRY RICHARD DAVIES.

REFERENCES CITED

The following references are of record in the file of this patent:

UNITED STATES PATENTS

| Number | Name | Date |
| --- | --- | --- |
| 1,959,690 | Roth | May 22, 1934 |
| 2,021,173 | Clark | Nov. 19, 1935 |
| 2,081,987 | Dawson | June 1, 1937 |
| 2,104,749 | Jones | Jan. 11, 1938 |
| 2,259,331 | Vedder | Oct. 14, 1941 |
| 2,288,567 | Heitman | June 20, 1942 |
| 2,295,297 | Schneider | Sept. 8, 1942 |
| 2,306,593 | Collom | Dec. 29, 1942 |
| 2,361,845 | Hutchins | Oct. 31, 1944 |
| 2,396,497 | Eisenberg | Mar. 12, 1946 |